Oct. 27, 1959   F. C. ARMISTEAD   2,910,592
SCINTILLATION TYPE DETECTOR
Filed Sept. 9, 1953   3 Sheets-Sheet 1

Oct. 27, 1959    F. C. ARMISTEAD    2,910,592
SCINTILLATION TYPE DETECTOR
Filed Sept. 9, 1953    3 Sheets-Sheet 3
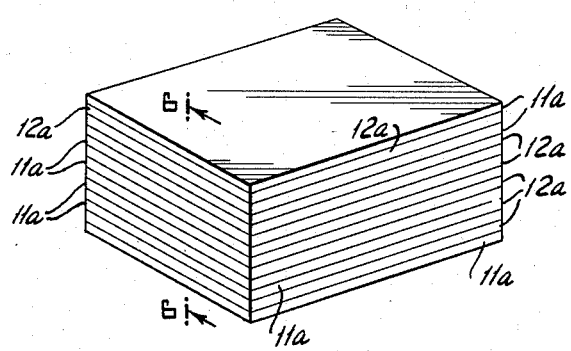
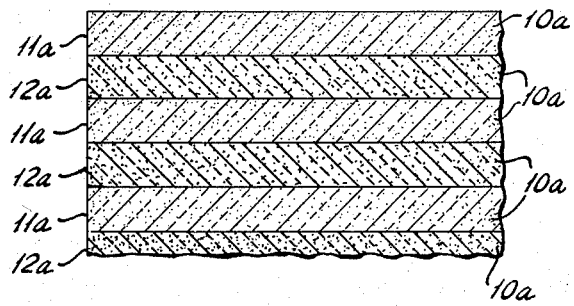

United States Patent Office 2,910,592
Patented Oct. 27, 1959

2,910,592

SCINTILLATION TYPE DETECTOR

Fontaine C. Armistead, Marblehead, Mass., assignor to Texaco Development Corporation, New York, N.Y., a corporation of Delaware Application September 9, 1953, Serial No. 379,126

18 Claims. (Cl. 250—71.5)

This invention relates to the detection of penetrative radiation, and more particularly, the simultaneous and distinguishable detection of two different types of radiation with a single apparatus.

Broadly speaking the purpose of this invention is to provide a method, and the means therefore, whereby it is possible to distinguish from one another the responses of a scintillation type detector to respective kinds of radiation to which it has been made sensitive. In particular the invention is concerned with the detection of neutron radiation and gamma radiation, and in further particular, with applications based on distinguishing between these two types of radiation, for example, in bore hole logging operations.

In brief, the apparatus contemplated by the present invention comprises a scintillation type detector in which the light producing detector head is made up of a combination of at least two luminophor elements. One of the elements is a so-called fast luminophor, the other a slow luminophor, and, preferably they are placed in close proximity to one another. The detector head is rendered sensitive to neutrons by admixing into the luminophor elements, or, preferably, interleaving between them, a substance which reacts with neutrons to emit ionizing radiation. A photo-sensitive device, such as a photomultiplier tube, converts light emitted by the luminophor elements into current pulses and feeds them to a selector circuit which is capable of distinguishing between pulses derived respectively from light produced in a single luminophor, whether it be a fast or slow one, and light produced simultaneously in luminophors numbering more than one and including at least one of each kind.

Before explaining the method of detection practiced with the present invention the action of fast and slow luminophors will be briefly reviewed. A slow luminophor is one which has a relatively large decay time constant so that when excited by a unit of penetrative radiation it emits luminescent light which, though it reaches a peak in brightness rather quickly, then dies off so gradually as to persist for a relatively long time. In contrast, a fast luminophor is one which when excited by a unit of radiation emits luminescent light which persists for only a relatively short time due to its having a relatively small decay time constant. For example, thallium-activated sodium iodide is a luminophor which has a decay constant of about one-fourth microsecond, whereas stilbene, which is a relatively "faster" luminophor, has a decay constant of a little less than $10^{-8}$ second.

When an impulse of light produced by a luminophor element is converted into a current pulse by a device such as a photo-multiplier tube, the peak amplitude of this pulse will be substantially proportional to the total light content of the impulse divided by the decay constant of the luminophor. Accordingly if E represents the energy dissipated by a particle traversing the luminophor, e represents the luminescent efficiency of the luminophor, and T represents the decay constant, the current pulse will have a peak amplitude proportional to $$\frac{E \cdot e}{T}$$

From this it can be seen that the amplitude of a current pulse derived from light produced in a fast luminophor will attain a larger peak value and be faster decaying, i.e., terminate sooner, than a pulse derived from light produced in a slow luminophor, and, as will be seen, on the basis of these differences, the two kinds of pulses can be distinguished from one another by a suitable electronic circuit.

In a preferred mode of operation of the invention, the detector head is exposed to the penetrative radiation which is to be detected and measured. In general substantially every gamma photon, of the mixed radiation component being measured, which produces a useable response in the detector head, will do so in only one or another of its luminophor elements, but not in more than one thereof and therefore will produce a light impulse which is either of large amplitude and short duration or small amplitude and large duration, i.e., impulses which are herein designated "single-time-constant" impulses, while a certain empirically determinable average percentage of all the neutron quanta, of said mixed radiation being measured, which produce useable responses in the detector head will do so with one of each of its two kinds of luminophor elements and therefore will produce composite light impulses each comprising a superposition or coincidence of one impulse of large amplitude and short duration with another of small amplitude and long duration, i.e., impulses which are herein designated "double-time-constant" impulses. The electrical pulses derived from double-time-constant impulses are easily and reliably distinguished from those derived from single-time-constant impulses by an electronic circuit such as that disclosed hereinafter. In this manner the separate detection and measurement of the gamma and neutron components of the mixed radiation is simultaneously attained.

Heretofore, the detection of mixed radiation or the components thereof has required such expedients as more photo-electric tubes, less reliable electronic circuits, selective shielding, and entirely separate detectors and therefore has been characterized by the use of relatively unwieldy and costly apparatus.

The present invention on the other hand provides a simple method for detecting mixed radiation and/or its components, and an uncomplicated, simple, and accurate apparatus for practicing this method. The simplicity and accuracy of the method and apparatus of this present method permits the detection of mixed radiation in locations, such as in a bore hole in the earth, wherein its detection is highly desirable, but where it was unduly difficult heretofore due to the complicated apparatus requirements.

These and further advantages of the present invention will be more fully described and explained in conjunction with the attached drawing wherein:

Figure 5 is a diagrammatic representation of a modified form of detector head in which fast and slow luminophor elements are provided with a neutron reactive additive and combined with one another in accordance with the invention.

Figure 6 is a diagrammatic representation showing a magnified cross-sectional view of a portion of the detector head shown in Figure 5.

Figure 1:
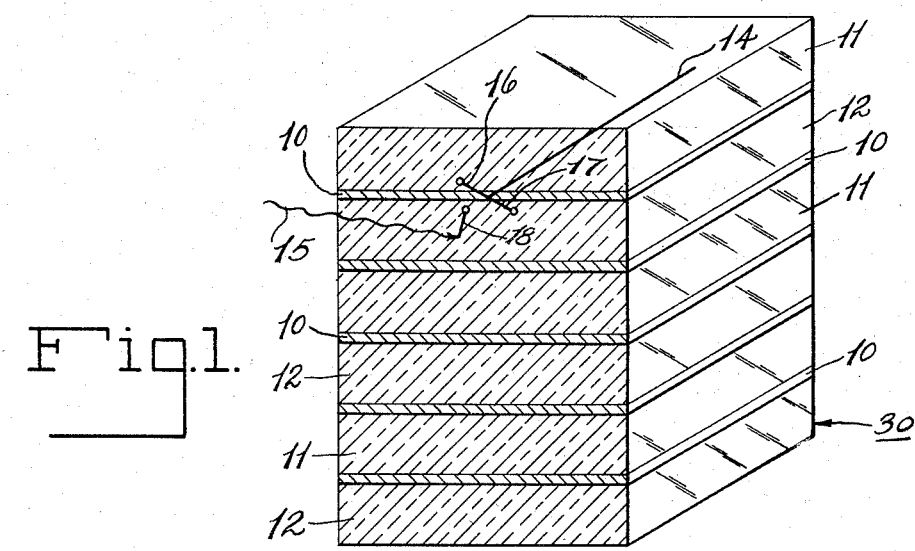
Fig. 1 is a diagrammatic representation of a cross sectional view of a detector head in which fast and slow luminophor elements are combined in one suitable way according to the present invention.

In Fig. 1, thin sections 10 of a neutron reactive material such as boron-10 or lithium-6 are shown positioned between and adjacent to alternate fast and slow luminophor elements, 11 and 12 respectively.

Boron-10 and lithium-6 are suitable materials for the sections 10, in accordance with the present invention, because their interactions with slow neutrons result, in each instance, in a release of two ionizing particles which move away from the interaction point in opposite directions, i.e., a 1.5 mev. alpha particle and a 0.8 mev. lithium nucleus in the case of boron-10 and a 2.6 mev. triton and a 2.0 mev. alpha particle in the case of lithium-6. Thus if the sections 10 are of such suitable materials and are thin enough, slow neutron reactions substantially always will be signalized by the simultaneous generation of two simultaneously-starting scintillations. As a result of the arrangement of the detector head with respective slow and fast luminophors positioned adjacent opposite sides of each of the sections 10 the two scintillations will be of different kinds one having a relatively high peak intensity and a fast decay and the other having a relatively lower peak intensity and a slow decay and together they will comprise a composite, double-time-constant light impulse from which a double-time-constant current pulse can be derived.

On the other hand, the light produced by an interaction of a gamma ray in the detector head will originate in substantially every instance in only one luminophor and therefore will constitute an impulse from which only a single-time-constant current pulse can be derived.

If borax is used as the boron-10 containing substance the average amount thereof through which slow neutrons must pass to incur a 50% chance of reacting therewith is about 0.30 mm. Since, however, the range of an alpha particle in borax is of the order of only 0.01 mm., all of this thickness should not be provided in a single section 10 and instead may be apportioned between all of them. Thus the detector head can be comprised of, for example, 16 slow luminophor elements, 15 fast luminophor elements, and 30 neutron-sensitive layers, each 0.01 mm. thick (at this thickness the neutron-sensitive layer is transparent to light), and it will give up to 50% neutron detection efficiency.

Stated otherwise, the desired neutron efficiency is equal to $$1 - e^{\frac{-L}{k}}$$

where L is the thickness of the neutron-sensitive layer and $k$ is equal to (the molecular weight of the luminophor)/(cross section per molecule for neutrons) × (specific gravity) × (Avogadro's number). Thus, if $Li_2Si_2O_5$ is used as the neutron-reactive substance, $$k = \frac{150}{130 \times 2.5 \times 0.6} = 0.77 \text{ cm.}$$

and for 75% neutron detection efficiency, $$0.75 = 1 - e^{\frac{-L}{0.77}}$$

or $L = 1.07$ cm. for $Li_2Si_2O_5$.

Respectively represented at 14 and 15 in Fig. 1 are hypothetical paths of penetration of a neutron and a gamma ray through the detector head. As shown by the path 14 the neutron may travel for a considerable distance without becoming involved in any interaction so long as its path is through luminophor material. However, this will not be true of any portion(s) of its path extending through one or more of the sections 10 inasmuch as suitable materials for these sections have extremely great "capture cross sections" for neutrons. Therefore there is a very preponderant likelihood that any neutron interaction which occurs in the detector head will occur in one of the sections 10. For reasons set forth above when such an interaction does occur two charged particles will be released from the interaction point and these two particles will move along paths, such as those represented at 16 and 17, which extend in exactly opposite directions, i.e., are 180° apart. If the sections 10 are thin enough, e.g., if they have thicknesses of the order of those specified above, the charged particles will be able to escape from the section and to respectively penetrate the two adjacent luminophors producing appropriate scintillations therein to together constitute a double-time-constant composite light impulse. While it is conceivable that occasionally the paths of the charged particles released by an interaction will extend entirely within the very thin cross section of a section 10 and parallel to, rather than into, the adjacent luminophors, the statistical frequency of such occurrences will be so extremely small that they either can be neglected entirely as not materially affecting the accuracy of the detector or they can be taken into consideration in calibrating it.

The behavior of gamma rays in the detector head is quite the converse, i.e., they have very little likelihood of having many of their interactions in the sections 10 because of the extreme thinness thereof and because the constituent material of the sections, despite its extraordinarily great capability for absorbing neutrons, it is not in the least unusually capable of absorbing gamma rays. Accordingly, most of any gamma rays which sustain interactions in the detector head will sustain them in one or another of the luminophor elements therein. Usually such interactions will result in the release of a single charged particle which will move in a single direction, e.g., along a path such as that shown at 18, and for such a short distance that it will usually move only through a single luminophor and therefore produce a single-time-constant light impulse.

Figure 2:
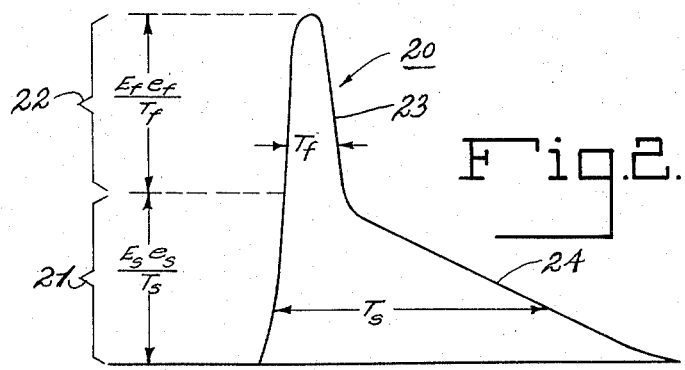
Fig. 2 represents the wave form of a typical double-time-constant output pulse derived from superimposed light impulses produced in coincidence by at least one of each of the fast and slow luminophor elements of the detector head of Fig. 1.

Referring now to Fig. 2, one part, 21, of the initial amplitude of the double-time-constant pulse 20 shown therein can be considered to have derived from energy released by a slow phosphor element and to be proportional to $(E_s \times e_s)/T_s$, and the remainder part, 22, to have derived from energy released by a fast phosphor and to be proportional to $(E_f \times e_f)/T_f$ where (as is more fully set forth on pages 414 and 415 of the August 1952 issue, vol. 23, No. 8, of the Review of Scientific Instruments), $E_s$ and $E_f$ represent the respective integrated luminescence efficiencies of the slow and fast luminophor elements; $e_s$ and $e_f$ represent the energy dissipated by ionizing particles in the respective slow and fast phosphors involved in producing the light impulse; and $T_s$ and $T_f$ are the respective decay time constants of the slow and fast luminophor elements. The effect of the small decay constant $T_f$ of the fast phosphor is graphically represented by the slope of the pulse 20 at 23 while that of the large decay time constant, $T_s$, of the slow phosphor is represented by its slope at 24. It will be seen that because of certain of the above described distinctive characteristics of its component parts a composite double-time-constant pulse is capable of being distinguished from single-time-constant pulses, by suitable electronic circuits.

Figure 3:
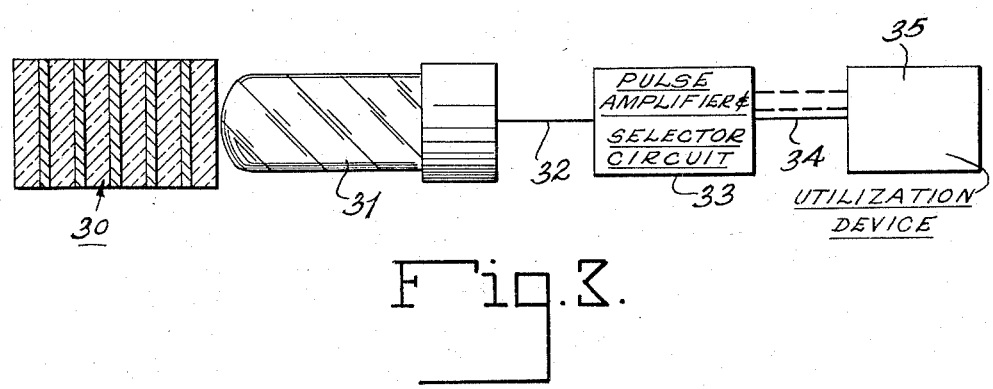
Fig. 3 is a block diagram of one form of a detecting apparatus of the present invention.

The apparatus represented by the block diagram of Fig. 3 comprises a detector head 30, like that shown in Fig. 1 and described above, positioned in a light-coupled relationship with a photo-multiplier tube 31. The tube 31 upon receiving light impulses from the detector head 30 converts them into electric current pulses which are transmitted over a circuit 32 to a pulse amplifier and selector 33 whose amplified and selected output is in turn transmitted over one or more circuits 34 to a utilization device comprising for example one or more counters and/or recorders and/or rate meters. As shown in this figure the axis of the photo-multiplier tube is perpendicular to the interfaces between the slab-like elements and wafer-like sections comprising the detector head, this being feasible due to the transparency of all of the constituents of the detector head. However, it is to be understood that if necessary, for example because of the use of opaque sections 10, these components may be oriented differently with respect to each other, such as with a forward extension of the axis of the tube extending through the center of the detector head parallel to the interfaces.

Figure 4:
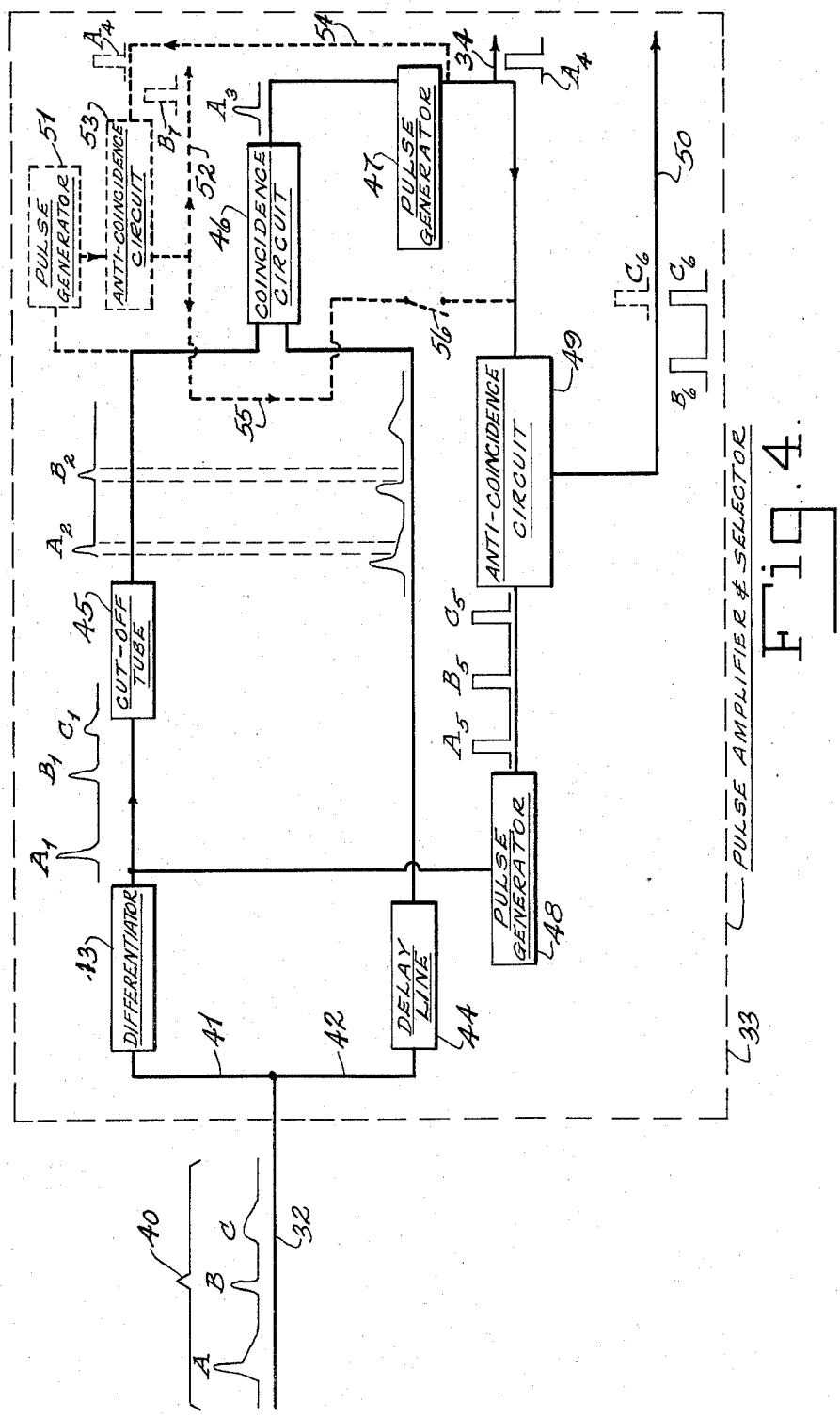
Fig. 4 is a diagram of an electronic circuit used in practicing the present invention to distinguish the output pulses from the fast and slow luminophors.

As represented at 40 in Fig. 4 by a simplified example of a train of only three pulses, all of the output of the photo-multiplier tube 31, after entering the amplifier and selector 33 over the circuit 32, are fed in multiple over a pair of branch circuits 41 and 42 to both a differentiator 43 and a delay line 44. To show the manner in which the amplifier and selector operates this example (40) includes one pulse of each kind, namely a double-time-constant pulse A, a single-time-constant short pulse B, and a single-time-constant long pulse C. In the delay line 44 the pulses A, B and C are delayed by a time interval slightly longer than the duration of the short pulses, such as B, but shorter than the duration of the long pulses, such as C. In the differentiator 43 the leading edges of the same pulses A, B and C are converted into short positive-going spike-like pulses $A_1$, $B_1$, $C_1$ whose peak amplitudes will correspond to those of the respective input pulses. If desired a uni-directional device, i.e., a crystal or thermionic diode, may be employed in the output of the differentiator to eliminate any negative-going spikes which it produces by its differentiation of the input pulses. Thus the differentiator 43 will provide pulses ($A_1$, $B_1$, $C_1$) which preserve the times of occurrence and amplitudes of the pulses A, B and C but are shortened to durations substantially equal to that of short pulses such as B. Since, as explained above, the short pulses (B) will have substantially greater amplitudes than long ones (C), the same will be true respecting the pulses $B_1$ and $C_1$. Moreover since the amplitude of the pulses A is substantially equal to the sum of those of the pulses B and C, the pulses $A_1$ will have an even greater amplitude than that of the pulses $B_1$. Accordingly the pulses $A_1$, $B_1$, $C_1$ are fed to a tube 45 biased sufficiently below cut off to pass only ones thereof whose amplitudes exceed that of the smallest ones $C_1$. As a result only two pulses $A_2$ and $B_2$ (corresponding to the peaks of the pulses $A_1$, $B_1$) will appear at the output of this tube, one coinciding in time with the first portion of the original double-time-constant pulse A and the other with substantially all of the single-time-constant short pulse B, the other single-time-constant pulse C having been eliminated. These pulses and the delayed pulses A, B, C are applied to two inputs of a coincidence circuit 46, such as a gated beam tube or any other tube having two normally-cut-off control electrodes both of which must receive positive-going signals in coincidence for it to produce an output signal. As a result of the delay imposed upon the train of waves A, B and C, the pulses $B_2$ and B will not reach the two inputs of the coincidence circuit at the same time and therefore, even acting together, they will be ineffectual to cause it to produce an output pulse. However, since a portion of the pulse A will coincide with the pulse $A_2$ despite the delay, these two pulses will be effective to together actuate the coincidence circuit 46 if its respective control grids are appropriately biased, e.g., are not cut off to any greater extent than the amplitude of what may be called the "back porch" portion of the pulse A. Therefore the overall result will be the emergence on the output of the coincidence circuit of a single pulse $A_3$ representative of only one of the three original pulses of the input train (40), namely the double-time-constant pulse A.

If desired the pulses $A_3$ may be used to trigger a pulse generator 47 to produce for each of the spike-like pulses $A_3$ a possibly more desirable square-wave type of pulse, $A_4$. Thus in the arrangement shown herein pulses of this kind will pass over an output 34 each time that a double-time-constant pulse reaches the input 40 from the photo-electric tube 31 and these pulses will represent only those responses of the scintillometer which were induced by neutrons.

In order to provide a second output over which all of the single-time-constant or gamma-induced pulses may be delivered an anti-coincidence arrangement is shown herein for subtracting from the total number of pulses provided by the photo-multiplier tube all thereof which are attributable to neutron interactions in the detector head. Accordingly the output of the differentiator 43 is fed to a pulse generator 48 which converts the train of pulses $A_1$, $B_1$, $C_1$ into a train of square waves $A_5$, $B_5$ and $C_5$. This train of waves and the output of the pulse generator 47 are fed to two inputs of an anti-coincidence circuit 49 comprising, for example, a normally enabled gate tube which is adapted to be disabled whenever a pulse $A_4$ is applied to one of its inputs. Accordingly the output 50 of this circuit will provide, in the example shown herein, only two pulses, herein designated $B_6$ and $C_6$, corresponding in their times of occurrence to and respectively representing the single-time-constant input pulses B and C and therefore representative solely of gamma induced responses of the detector head.

As mentioned above the outputs 34 and 50 of the amplifier and selector circuit 33 may finally be fed to any suitable utilization circuit(s), such as counters, recorders, and/or rate meters.

While it is to be understood that any materials having satisfactory properties, e.g., efficiency in converting penetrative radiation into light, good transmission of its own luminescence, appropriate decay time, etc., may be used for the luminophor elements 11 and 12 including any which may be discovered or developed in the future as well as those which are now known, the following are mentioned as suitable solely by way of example: most of the well-known organic luminophors as fast luminophors, e.g., stilbene as mentioned above, 1,4-diphenylbutadiene, quaterphenyl, terphenyl, and diphenylacetylene, all of which have decay constants of the order of $10^{-8}$ second; and many of the well-known inorganic luminophors as slow luminophors, e.g., NaI(Tl) which was mentioned above and has a decay time constant of about one-quarter microsecond.

If desired, the sections 10 can be dispensed with by making one of the sets of luminophor elements, 11 or 12, of a phosphor material which is itself neutron reactive, such as $Li_2Si_2O_5(Ti)$ or an Sn-activated lithium halide, or which can be made so by admixture of suitable neutron reactive material(s), provided (1) it has an adequate capture cross section for neutrons so that even though the elements in question are made thin enough to incur only a negligible percentage of the total number of gamma interactions which take place in the detector head they will still capture enough neutrons to afford satisfactory efficiency in the detection thereof and (2) the charged-particle by-products of the neutron interactions have short enough ranges so that in substantially all instances of neutron captures the ionizing by-products will energize only the phosphor elements in which those captures occur, i.e., neutron-reactive phosphors.

Figure 5 illustrates a detector head wherein the neutron reactive material is in admixture with the luminophor material. Figure 6 shows a magnified cross-section of a portion of the detector head shown in Figure 5. In the last-mentioned figures, a layer of fast luminophor material 11a is alternately positioned with layers of slow luminophor material 12a. The respective luminophor layers 11a and 12a are impregnated with appropriate neutron reactive material 10a, as referred to above. The thinness of the respective layers 11a and 12a should be such that the ionizing particles emanating from the neutron reactive material as a result of impingement thereon by neutrons, may, in turn, produce scintillations in phosphor material of both types, i.e., both slow and fast phosphors 11a and 12a, in order to provide for the detection of neutrons through simultaneous fast and slow scintillations.

It is noted by way of example only, and not by way of limitation, that boron and certain fissionable materials such as uranium and thorium are included among presently-known materials which are suitable for admixing with inorganic phosphors to render them appropriately neutron reactive.

Where the sections 10 are thus dispensed with the output of the photo-electric tube 31 will contain only single-time-constant pulses, some of them being "long" ones and the others "short," except for an occasional double-time-constant pulse signalizing that a neutron and a gamma ray happen to be detected simultaneously, and the long and short pulses will respectively represent neutrons and gamma photons, or vice versa, depending on whether the set of slow or fast phosphor elements is the neutron reactive one. Accordingly in such an embodiment the output of the cutoff tube 45 will contain substantially only the spike-shaped pulses ($B_2$) which represent short, large-amplitude input pulses B. Provision is made, as shown in the dotted-line portions of Fig. 4, for similarly separating out pulses representing only long, small-amplitude input pulses C. To this end the spike-shaped pulses ($B_2$) are fed to a pulse generator 51 which responds to them to produce a corresponding number of differently shaped pulses, i.e., square waves, which are more suitable for actuating utilization devices and gate-tube anti-coincidence circuits such as the circuit 49. These pulses ($B_7$) reach an output circuit 52 via a second anti-coincidence circuit 53 which will be disabled in the time channel of any possible output pulses $A_4$ as the result of a connection 54 between an appropriate one of its inputs and the output of the pulse generator 47. The pulses ($B_7$) may be applied to the anti-coincidence circuit 49 (over a connection 55) to assist the pulses ($A_4$) in actuating it by closing a switch 56 when it is desired to deliver only pulses representing long pulses ($C_6$) over the output 50 rather than all of the single-time-constant pulses.

The improved scintillometers of the present invention are particularly applicable to certain kinds of radioactivity bore hole logging such as kinds in which a source of radiation is moved through the bore hole to irradiate surrounding earth formations to thereby induce other radiation therein and/or scatter back some of the primary radiation. Thus in neutron-neutron logging neutrons are sent into the formations, wherein they are scattered to a degree dependent on the nature of the formations, and the portion of the scattered neutrons which returns to the bore hole is detected in order to measure the extent of the scattering; and in neutron-gamma logging neutrons are sent into the formation, wherein they may interact characteristically with certain atoms, if a sufficient number thereof is present therein, e.g., with hydrogen atoms, to "induce," gamma radiation, and the portion of the secondary radiation which finds its way into the bore hole is detected to measure the probable concentration of such atoms. In both of the above-mentioned logging methods one of the principal difficulties which has been encountered derives from the fact that a detector which is meant to measure the intensity of one type of radiation is usually likely to be susceptible to another kind and that mixed radiations are usually unavoidably present in the region under examination, since, for example, in the logging methods mentioned above neutron sources comprising radium and beryllium are prone unavoidably to emit gamma radiation, as well as neutrons, and even the formations themselves are constantly emitting gamma radiation, albeit in relatively very small amounts. While suggestions have been made for selectively shielding the detector from the undesired type of radiation or for suppressing in the output of the detector counts induced by said undesired radiation, it would be much more desirable to be able actually to separate counts induced by the respective kinds since this will afford different kinds of information all of which may be relevant as to the nature of the earth formations and may be particularly significant when simultaneously obtained. Accordingly neutron-neutron and neutron-gamma logging runs may be effected simultaneously by employing, as disclosed above, either detector heads comprising elements 11 and 12 and sections 10 or detector heads in which the sections 10 are dispensed with. Since in cases of the latter type double-time-constant pulses will represent simultaneous occurrences of both neutron and gamma-ray induced counts, the count thereof may either be disregarded as statistically unimportant or added as a correction to each of other outputs, i.e., the neutron and gamma-ray induced counts.

Of course, if it is desired merely to use the present radiation detectors for either a neutron-neutron logging or a neutron-gamma logging run off separately rather than simultaneously, the apparatus shown herein is so flexible that it easily can be employed, as disclosed, to produce counts which represent only detected neutrons or detected gamma photons as the case may be and nothing else.

It is to be understood that the present invention does not depend upon the choice of any particular type of circuit for separating single and double-time-constant pulses from one another and that the circuit shown in Fig. 4 is being disclosed herein merely by way of example. However, if desired, any other suitable circuit may be employed such as that referred to in the Review of Scientific Instruments 23, page 416, col. 1, where the author mentions "a crude circuit which has been successfully tested . . . ."

Obviously, many modifications and variations of the invention, as hereinbefore set forth, may be made without departing from the spirit and scope thereof, and therefore only such limitations should be imposed as are indicated in the appended claims.

I claim:

1. A scintillation type detector head including a luminophor element of a first type comprising a phosphor material having a suitable decay-time-constant for producing scintillations having a predetermined average duration and a predetermined average peak intensity and positioned closely thereto a luminophor element of a second type comprising another phosphor material having a substantially longer decay-time-constant for producing scintillations of correspondingly greater average duration and lesser average peak intensity, and a quantity of a material which is reactive with neutrons and has a large capture cross section therefor for converting neutrons into short-range, highly-ionizing charged-particles, said neutron reactive material being in intimate cooperative relationship with both types of element, whereby it is suitable to produce scintillations in the phosphor material comprised in both of said types of element, the neutron reactive material being disposed in the detector head in a layer which is so thin with respect to the total thickness of the detector head in the direction corresponding to a predetermined probable path of penetrative radiation to be detected as to have a very small probability of absorbing a gamma ray which enters it along said path.

2. A detector head as in claim 1 in which said neutron reactive material is disposed in the detector head as said layer between said closely positioned together luminophor elements, is thinner than even the range of said short-range charged-particles, and is of a type whose interactions with neutrons produce pairs of oppositely moving charged-particles.

3. A detector head as in claim 2 which includes a plurality of said layers of said neutron reactive material and also a plurality of said two types of elements positioned in alternating succession in the detector head with a respective one of said layers between each pair of elements of the two different types.

4. A detector head as in claim 3 which includes enough of said thin layers to afford a desired predetermined probability of absorbing a neutron moving through the detector head along said path.

5. A detector head as in claim 1 in which said neuton reactive material is disposed in the detector head in admixture with the material comprising one of said phosphor elements whereby said element itself constitutes said layer of said specified thinness.

6. A detector of penetrative radiation comprising a scintillation type detector head including a luminophor element of a first type comprising a phosphor material having a suitable decay-time-constant for producing single time constant light pulses having a predetermined average duration and a predetermined average peak intensity, and positioned closely thereto a luminophor element of a second type comprising a different phosphor material having a substantially longer decay-time-constant for producing single time constant light pulses of correspondingly greater average duration and lesser average peak intensity, and a quantity of a material which is reactive with neutrons and has a large capture cross section therefor for converting neutrons into pairs of short-range, highly-ionizing charged-particles, said neutron reactive material being in intimate cooperative relationship with both of said luminophor elements, whereby it is suitable to produce light pulses simultaneously in the phosphor material in both of said types of element to produce double time constant light pulses; means responsive to light pulses from said scintillation type detector head for converting light pulses into electrical pulses; first electrical circuit means responsive to electrical pulses produced by single time constant light pulses emanating individually from said luminophor elements of said first and second types, for indicating the intensity of gamma radiation impinging on said scintillation type detector head; and second electrical circuit means responsive to electrical pulses produced by double time constant light pulses emanating concurrently from a pair of said luminophor elements of said first and second types, for indicating the intensity of neutron radiation impinging on said scintillation type detector head.

7. A detector of penetrative radiation comprising a scintillation type detector head including a luminophor element of a first type comprising a phosphor material having a suitable decay-time-constant for producing single time constant light pulses having a predetermined average duration and a predetermined average peak intensity, and positioned closely thereto a luminophor element of a second type comprising a different phosphor material having a substantially longer decay-time-constant for producing single time constant light pulses of correspondingly greater average duration and lesser average peak intensity, and a quantity of a material which is reactive with neutrons and has a large capture cross section therefor for converting neutrons into pairs of short-range, highly-ionizing charged-particles, said neutron reactive material being in intimate cooperative relationship with both of said luminophor elements, whereby it is suitable to produce light pulses simultaneously in the phosphor material in both of said types of element to produce double-time-constant light pulses; means responsive to light pulses from said detector head for producing electric signals of different characteristic for single and double-time-constant light pulses, means for separating the electric signal corresponding to double-time-constant pulses from the electric signal corresponding to single-time-constant pulses, means for indicating the intensity of single-time-constant signals due to the impingement of gamma radiation on said detector head, and means for indicating the intensity of double-time-constant signals due to the impingement of neutron radiation on said detector head.

8. A scintillation type detector head comprising a quantity of relatively fast luminophor material having a relatively short decay time constant, a quantity of relatively slow luminophor material having a relatively long decay time constant, and a quantity of neutron reactive substance in intimate cooperative relationship with both said fast and slow luminophor materials, said neutron reactive substance being characterized in that it has a relatively large capture cross-section for neutrons and is characterized by the simultaneous emission of a plurality of interaction by-products due to a single neutron interaction, said interaction by-products being capable of energizing both of said luminophor materials, whereby neutrons intercepted by the detector head and interacting with said substance have a high probability of producing scintillations simultaneously in both said fast luminophor material and said slow luminophor material.

9. A detector head according to claim 8 wherein said neutron reactive substance is boron-10.

10. A detector head according to claim 8 wherein said neutron reactive substance is lithium-6.

11. A detector of mixed types of penetrative radiation comprising in combination a scintillation type detector head comprising a quantity of relatively fast luminophor material having a relatively short decay time constant, a quantity of relatively slow luminophor material having a relatively long decay time constant, and a quantity of neutron reactive substance in intimate cooperative relationship with both said fast and slow luminophor materials, said neutron reactive substance being characterized in that it has a relatively large capture cross-section for neutrons and is characterized by the simultaneous emission of a plurality of interaction by-products due to a single neutron interaction, said interaction by-products being capable of energizing both of said luminophor materials, whereby neutrons intercepted by the detector head and interacting with said substance have a high probability of producing scintillations simultaneously in both said fast luminophor material and said slow luminophor material, means responsive to scintillations simultaneously occuring in both said fast and slow luminophor materials for indicating the intensity of neutron radiation intercepted by the detector head and interacting with said substance, and means responsive to other scintillations occurring at separate times in the fast and slow luminophor materials for indicating the intensity of other radiation intercepted by said detector head and which results in said other scintillations.

12. A detector of neutron radiation comprising in combination a scintillation type detector head comprising a quantity of relatively fast luminophor material having a relatively short decay time constant, a quantity of relatively slow luminophor material having a relatively long decay time constant, and a quantity of neutron reactive substance in intimate cooperative relationship with both said fast and slow luminophor materials, said neutron reactive substance being characterized in that it has a relatively large capture cross-section for neutrons and is characterized by the simultaneous emission of a plurality of interaction by-products due to a single neutron interaction, said interaction by-products being capable of energizing both of said luminophor materials, whereby neutrons intercepted by the detector head and interacting with said substance have a high probability of producing scintillations simultaneously in both said fast luminophor material and said slow luminophor material, and means responsive to scintillations simultaneously occurring in both said fast and slow luminophor materials for indicating the intensity of neutron radiation intercepted by the detector head and interacting with said substance.

13. A neutron detector as in claim 12 wherein the detector head comprises a plurality of alternate layers of fast and slow luminophor materials respectively, and wherein the neutron reactive substance comprises a plurality of individual layers thereof interleaved between the respective slow and fast luminophor layers.

14. A scintillation type detector head comprising a quantity of relatively fast luminophor material having a relatively short decay time constant, a quantity of relatively slow luminophor material having a relatively long decay time constant, a quantity of a substance having a relatively high capture cross-section for a first type of radiation as compared with the capture cross-section of said substance for certain other radiation that may be mixed therewith, said substance being characterized by the simultaneous emission of a plurality of interaction by-products as the result of each interaction by radiation of said first type, said substance being disposed in cooperative relationship with both said fast and slow luminophor materials such that said interaction by-products have an opportunity to energize both said slow and fast luminophor materials simultaneously in response to a single interaction with said substance by radiation of said first type in order simultaneously to produce both short and long time constant scintillations in response to radiation of said first type.

15. A neutron detector as in claim 14 wherein the detector head comprises a plurality of alternate layers of fast and slow luminophor materials respectively, and wherein said substance comprises a plurality of individual layers thereof interleaved between the respective slow and fast luminophor layers.

16. A scintillation type detector comprising in combination a detector head including a quantity of relatively fast luminophor material characterized by scintillations of relatively high amplitude and short duration, a quantity of relatively slow luminophor material characterized by scintillations of relatively low amplitude and long duration, a quantity of a substance having a relatively high capture cross-section for a first type of radiation as compared with the capture cross section of said substance for certain other radiation that may be mixed therewith, said substance being characterized by the simultaneous emission of a plurality of interaction by-products as the result of each interaction by radiation of said first type, said substance being disposed in cooperative relationship with both said fast and slow luminophor materials such that said interaction by-products have an opportunity to energize both said slow and fast luminophor materials simultaneously in response to a single interaction with said substance by radiation of said first type in order to produce scintillations of relatively high amplitude and short duration simultaneously with scintillations of relatively low amplitude and long duration in response to radiation of said first type, means selectively responsive to scintillations simultaneously occurring in both said fast and slow luminophor materials respectively for indicating the intensity of said first radiation intercepted by the detector head and interacting with said substance to the substantial exclusion of other radiation intercepted by said detector head and which results in non-simultaneous scintillations in the respective luminophor materials.

17. A scintillation type detector comprising in combination a detector head including a quantity of a first luminophor material characterized by scintillations of relatively high amplitude, a quantity of a second luminophor material characterized by scintillations of relatively low amplitude, a quantity of a substance having a relatively high capture cross-section for a first type of radiation as compared with the capture cross section of said substance for certain other radiation that may be mixed therewith, said substance being characterized by the simultaneous emission of a plurality of interaction by-products as the result of each interaction by radiation of said first type, said substance being disposed in cooperative relationship with both said first and second luminophor materials such that said interaction by-products have an opportunity to energize both said first and second luminophor materials simultaneously in response to a single interaction with said substance by radiation of said first type in order to produce scintillations of relatively high amplitude simultaneously with scintillations of relatively low amplitude in response to radiation of said first type, means selectively responsive to scintillations simultaneously occurring in both said first and second luminophor materials respectively for indicating the intensity of said first radiation intercepted by the detector head and interacting with said substance to the substantial exclusion of other radiation intercepted by said detector head and which results in non-simultaneous scintillations in the respective luminophor materials.

18. A scintillation type detector comprising in combination a detector head including a quantity of a first luminophor material characterized by scintillations of relatively short duration, a quantity of a second luminophor material characterized by scintillations of relatively long duration, a quantity of a substance having a relatively high capture cross-section for a first type of radiation as compared with the capture cross section of said substance for certain other radiation that may be mixed therewith, said substance being characterized by the simultaneous emission of a plurality of interaction by-products as the result of each interaction by radiation of said first type, said substance being disposed in cooperative relationship with both said first and second luminophor materials such that said interaction by-products have an opportunity to energize both said first and second luminophor materials simultaneously in response to a single interaction with said substance by radiation of said first type in order to produce scintillations of relatively short duration simultaneously with scintillations of relatively long duration in response to radiation of said first type, means selectively responsive to scintillations simultaneously occurring in both said first and second luminophor materials respectively for indicating the intensity of said first radiation intercepted by the detector head and interacting with said substance to the substantial exclusion of other radiation intercepted by said detector head and which results in non-simultaneous scintillations in the respective luminophor materials.

References Cited in the file of this patent

UNITED STATES PATENTS

| | | |
|---|---|---|
| 2,413,459 | Lynch | Dec. 31, 1946 |
| 2,648,012 | Scherbatskoy | Aug. 4, 1953 |
| 2,651,584 | Longini et al. | Sept. 8, 1953 |
| 2,666,145 | Eversole et al. | Jan. 12, 1954 |
| 2,769,916 | Tittle | Nov. 6, 1956 |
| 2,799,780 | Ruderman | July 16, 1957 |